US010769054B1

(12) United States Patent
Henkle et al.

(10) Patent No.: US 10,769,054 B1
(45) Date of Patent: Sep. 8, 2020

(54) INTEGRATED PROGRAM CODE MARKETPLACE AND SERVICE PROVIDER NETWORK

(71) Applicant: Amazon Technologies, Inc., Seattle, WA (US)

(72) Inventors: Charlotte Elaine Henkle, Seattle, WA (US); Samuel Ytzhak Donnelley, Auburn, WA (US); Sunbir Gill, Irvine, CA (US); Ameesh Paleja, Irvine, CA (US); Matthew A. Jones, Ladera Ranch, CA (US); Alexander Lowell Rouse, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1276 days.

(21) Appl. No.: 14/180,067

(22) Filed: Feb. 13, 2014

(51) Int. Cl.
*G06F 11/36* (2006.01)
*G06F 8/60* (2018.01)
*G06Q 30/06* (2012.01)

(52) U.S. Cl.
CPC ............ *G06F 11/3668* (2013.01); *G06F 8/60* (2013.01); *G06Q 30/0601* (2013.01)

(58) Field of Classification Search
CPC .... G06Q 30/0601; G06F 11/3668; G06F 8/60
USPC ...................................................... 705/26.1
See application file for complete search history.

(56) References Cited

U.S. PATENT DOCUMENTS

| 8,826,239 B2* | 9/2014 | Sawano | G06F 11/3684 717/126 |
| 2002/0191774 A1* | 12/2002 | Creamer | H04Q 3/0029 379/230 |
| 2004/0243338 A1* | 12/2004 | Sabiers | H04L 43/50 702/122 |

(Continued)

OTHER PUBLICATIONS

Anonymous, Telecommunications; Apkudo Announces Android Device Testing Software for Manufacturers and Service Providers, Feb. 23, 2012, Computers, Networks & Communications, 112. ISSN 19441568, p. 1. (Year: 2012).*

(Continued)

*Primary Examiner* — Jason B Dunham
*Assistant Examiner* — Brittany E Bargeon
(74) *Attorney, Agent, or Firm* — Lee & Hayes, P.C.

(57) ABSTRACT

Functionality is disclosed herein for integrating a program code marketplace and a service provider network. A program code marketplace system is configured to provide a program code marketplace through which developers or other users can list program code for sale. Program code offered through the program code marketplace may have an associated execution environment definition that defines an execution environment for the program code. A request may be received to deploy program code available through the program code marketplace to a service provider network for execution. In response thereto, the execution environment definition may be utilized to create an execution environment in the service provider network. The program code may then be deployed to the execution environment in the (Continued)

service provider network for execution. The program code marketplace may integrate with other systems, such as a payments system, for processing micropayments for program code available through the program code marketplace.

20 Claims, 10 Drawing Sheets

(56) References Cited

U.S. PATENT DOCUMENTS

| | | | |
|---|---|---|---|
| 2006/0183085 A1* | 8/2006 | Amit | G09B 7/00 434/118 |
| 2007/0240127 A1* | 10/2007 | Roques | G06F 8/315 717/136 |
| 2008/0140537 A1* | 6/2008 | Powell | G06Q 30/0601 707/705 |
| 2010/0138316 A1* | 6/2010 | Connors | G06Q 30/0601 705/26.1 |
| 2010/0228683 A1* | 9/2010 | Ansley | G06Q 10/067 705/348 |
| 2011/0185231 A1* | 7/2011 | Balestrieri | G06F 11/3672 714/27 |
| 2012/0304160 A1* | 11/2012 | Soeder | G06F 8/41 717/148 |
| 2013/0110726 A1* | 5/2013 | Pereira | G06F 21/105 705/59 |
| 2013/0152047 A1* | 6/2013 | Moorthi | G06F 11/368 717/124 |
| 2013/0174126 A1* | 7/2013 | Belihomji | G06F 11/3688 717/127 |
| 2013/0312102 A1* | 11/2013 | Brake | G06F 21/577 726/25 |
| 2014/0058871 A1* | 2/2014 | Marr | G06F 9/45533 705/26.1 |
| 2014/0165034 A1* | 6/2014 | Balasubramanian | G06F 8/71 717/121 |
| 2015/0058675 A1* | 2/2015 | Kadishay | G06F 11/368 714/38.1 |

OTHER PUBLICATIONS

Web article: "Kickstart your Software Project" published by Binpress [online][retrieved on Jan. 13, 2014] retrieved from: http://www.binpress.com , 3 pps.

* cited by examiner

INTEGRATED PROGRAM CODE MARKETPLACE AND SERVICE PROVIDER NETWORK

BACKGROUND

Software developers are frequently faced with programming challenges that may have been previously addressed by other software developers. In the face of such a coding problem, therefore, it is not uncommon for software developers to search the World Wide Web ("Web") to determine whether another software developer has previously addressed the same problem and has made the solution available for others to use.

Finding a solution to a coding problem on the Web may, however, be difficult. Moreover, even if a software developer finds a solution to a coding problem created by another developer on the Web, it can be difficult for the software developer to know whether the solution can be trusted. Additionally, it might also be difficult and/or time consuming for the software developer to configure all of the dependencies that the solution to the coding problem requires to execute properly.

The disclosure made herein is presented with respect to these and other considerations.

DETAILED DESCRIPTION

Figure 1:
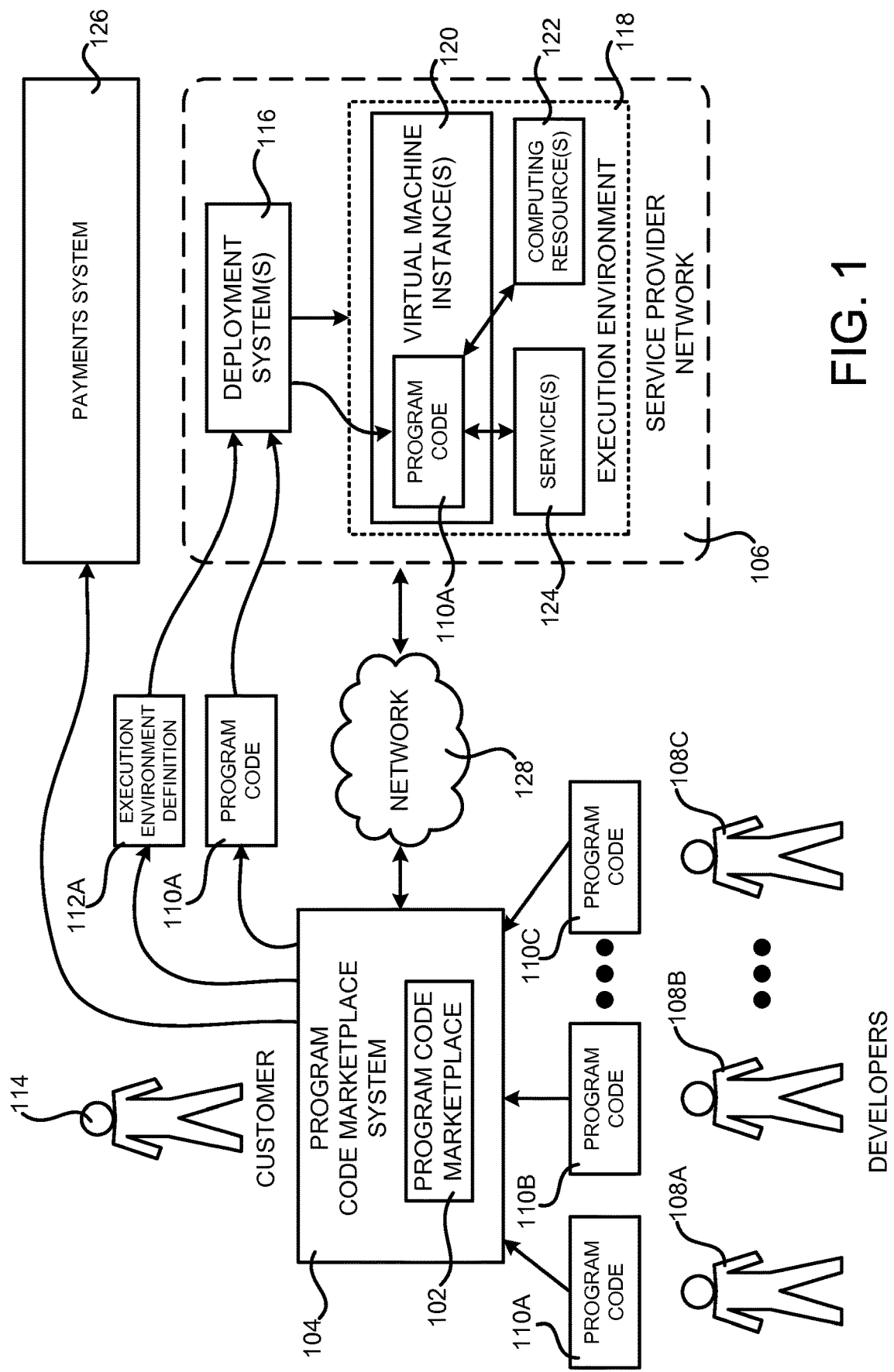
FIG. 1 is a system architecture diagram showing aspects of the operation of one illustrative mechanism disclosed herein for integrating a program code marketplace and a service provider network, according to one embodiment.

The following detailed description is directed to technologies for integrating a program code marketplace and a service provider network. Utilizing the technologies described herein, a program code marketplace can be provided through which developers can list program code for sale and use by others. The program code marketplace may also provide various features through which developers can discover and ascertain the quality and/or trustworthiness of program code listed on the program code marketplace. For example, and without limitation, the program code marketplace may provide functionality for searching and navigating available program code, for providing and viewing ratings for program code and/or software developers, for providing reviews of program code and/or software developers, for providing recommendations of program code and/or software developers, and for providing a community for discussing program code and/or software developers. Through these mechanisms, and potentially others, software developers can discover program code for sale and ascertain the applicability and trustworthiness of the program code.

The program code marketplace might also be integrated with a service provider operated network-based distributed computing environment (which may be referred to herein as a "service provider network") in order to facilitate deployment and execution of program code made available through the program code marketplace. Such a service provider network allows customers to purchase and utilize computing resources, such as virtual machine instances, data storage resources, database resources, network-accessible services, networking resources, and other types of computing resources on a permanent or as-needed basis.

In order to enable integration between the program code marketplace and a service provider network, program code offered through the program code marketplace may have an associated execution environment definition. The execution environment definition defines aspects of an execution environment in the service provider network that may be utilized to execute the program code. For example, and without limitation, the execution environment definition may define a configuration for one or more hardware devices or virtual machine instances utilized to execute the program code, one or more other computing resources utilized by the program code, one or more network services utilized by the program code, one or more other programs utilized by the program code, a network configuration for the execution environment and, potentially, configuration information defining the configuration of other types of components.

A request may be received to deploy program code from the program code marketplace to the service provider network. For example, and without limitation, a software developer may purchase program code from the program code marketplace and request to deploy the purchased program code to the service provider network for execution. In some embodiments, a developer might be permitted to deploy the program code to the service provider network prior to purchasing in order to test aspects of the operation of the program code.

In response to receiving a request to deploy program code offered through the program code marketplace to a service provider network, the execution environment definition associated with the program code may be utilized to create a suitable execution environment in the service provider network for the program code. For example, and without limitation, suitably configured virtual machine instances may be configured and instantiated, network services may be configured, software may be installed, network configuration may be performed, and other types of configuration may be made pursuant to the execution environment definition. The program code may then be deployed to the execution environment for execution.

Once the execution environment has been created in the service provider network and the program code has been deployed to the execution environment, the program code may be executed. For example, and without limitation, the program code may be executed in the execution environment to test the execution of the program code and/or to test the suitability of the program code to perform a certain task. The program code might also be executed in order to process production network traffic.

In some implementations, the program code marketplace is configured to interoperate with other systems, such as a payments system. In these embodiments, the program code marketplace may be configured to permit micropayments for program code available through the program code marketplace. The program code marketplace might also interoperate with other systems to provide other types of functionality in other embodiments. Additional details regarding the various components and processes described above for providing a program code marketplace and for integrating the program code marketplace with a service provider network will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system architecture diagram showing aspects of the operation of one illustrative mechanism disclosed herein for integrating a program code marketplace 102 and a service provider network 106, according to one embodiment. As shown in FIG. 1, a program code marketplace system 104 is provided in one embodiment disclosed herein. The program code marketplace system 104 includes one or more computing systems and associated software configured to provide a program code marketplace 102. As discussed in greater detail below, the program code marketplace 102 provides functionality for allowing software developers 108A-108C, or other users, to list program code 110A-110C, respectively, on a marketplace for sale and use by others.

The developers 108A-108C and other users may connect to the program code marketplace 102 utilizing a suitably equipped computer, such as a laptop, desktop, or tablet computer. The program code marketplace 102 may provide user interfaces through which the developers 108A-108C can upload the program code 110A-110C for listing in the program code marketplace 102. Along with the program code 110A-110C, the developers might also supply unit tests, documentation, a list of execution environments with which the program code 110 has been tested, and/or other materials. Additionally, and as will be described in greater detail below, the developers 110A-110C might also supply an execution environment definition 112 with the program code 110A-110C. As will be described below in greater detail, the execution environment definition 112 defines aspects of an execution environment for the supplied program code 110.

The program code 110 might be directly executable code or program code that must be compiled or otherwise processed prior to execution (e.g. source code). The program code 110 might also be small "snippets" of program code, such as a single function or method, a class or multiple classes, libraries, an application, or a collection of software components configured to provide a solution.

The developer 108A-108C that supplies the program code 110 to the program code marketplace 102 might also specify terms of payment, if any, for the program code 110. For example, and without limitation, the developer 108 might specify a one-time payment price for the program code 102. The developer 108 might alternately specify a payment model for program code 110 that is based upon usage of the program code 110 or a subscription model for paying for program code 110 on an ongoing basis. Other types of payment models might also be specified.

The developer 108A-108C that supplies the program code 110 to the program code marketplace 102 might also specify the terms of a license under which others may utilize the program code 110. For example, and without limitation, a developer 108 supplying program code 110 might specify an open source license under which the supplied program code 110 is to be utilized. Other types of licenses might also be specified for program code 110 offered through the program code marketplace 102.

In some embodiments, the program code marketplace system 104 performs vetting of program code 110 prior to listing the program code 110 on the program code marketplace 102. For example, various types of automated and manual analyses may be performed on the program code 110 prior to listing the program code 110 on the program code marketplace 102. Through this vetting process, a determination may be made as to whether the program code 110 performs any malicious or otherwise undesirable operations. If the program code 110 is determined to be malicious or otherwise inappropriate for listing on the program code marketplace 102, the submission of the program code 110 will be declined.

In some embodiments, the program code 110 submitted for inclusion in the marketplace 102 is compiled and executed prior to inclusion in the marketplace 102. Program code 110 that does not compile or execute properly may not be listed in the marketplace 102. Additionally, program tests provided by the developer 108 submitting the program code 110 might also be performed on the program code 110 prior to inclusion in the marketplace 102. Additionally, various types of static and dynamic analyses might be performed on the program code 110 prior to inclusion in the marketplace 102. These analyses might also be performed at the time program code 102 is deployed to the service provider network 106 for execution. The various types of vetting processes described above might also be performed at other times. Additionally, it should be appreciated that the execution environment 118 might be created, configured, and utilized to perform tests on the program code 110 prior to inclusion of the program code 110 in the marketplace 102.

If the program code marketplace system 104 determines that the program code 110 is suitable for listing on the program code marketplace 102, the program code 110 will be offered for sale through the program code marketplace 102. Customers of the program code marketplace 102, such as the customer 114, can then browse, search, and otherwise interact with the program code marketplace 102 to identify program code 110 of interest. If the customer 114 identifies program code 110 of interest, the customer 114 may choose to purchase the program code 110 according to the terms specified by the developer 108 or other user that provided the program code 110 to the program code marketplace 102.

The program code marketplace 102 might also provide various features through which customers 114 and developers 108 can discover and ascertain the quality and/or trustworthiness of program code 110 listed on the program code marketplace 102. For example, and without limitation, the program code marketplace 102 may provide functionality for searching and navigating available program code 110, for providing and viewing ratings for program code 110 and/or software developers 108, for providing reviews of program code 110 and/or software developers 108, for providing recommendations of program code 110 and/or software developers 108, and for providing a community for discussing program code and/or software developers. Through these mechanisms, and potentially others, customers 114 and software developers 108 can discover program code 110 for sale and ascertain the applicability and trustworthiness of the program code 110. Additional details regarding these aspects of the program code marketplace 102 will be provided below with regard to FIG. 2.

As described briefly above, the program code marketplace system 104 might operate in conjunction with a service provider network 106, from which customers 114 can purchase and utilize computing resources 122 (which may be referred to herein as "resources 122"), such as virtual machine instances 120 and/or other types of computing resources, from a service provider on a permanent or as-needed basis.

Each type or configuration of a computing resource 122 may be available from the service provider network 106 in different sizes. For example, a service provider might offer virtual machine instances 120 or other types of data processing resources that are available for purchase and use that have many different configurations of processor capabilities, main memory, disk storage, and operating system. A service provider might also offer other types of resources 122 for purchase and use by customers. For example, a service provider might offer hardware devices, database resources, file or block data storage resources, and/or networking resources, such as load balancing resources, domain name service ("DNS") resources, virtual private cloud ("VPC") resources, virtual local area network ("VLAN") resources, and/or other types of hardware and software computing resources on a permanent or as-needed basis. Details regarding several illustrative configurations for certain types of data processing resources will be provided below with regard to FIG. 7.

The service provider operating the service provider network 106 might also charge a fee for operating the resources 122 to a customer that creates and uses the resources 122. The fee charged for a particular resource 122 might be based upon the type and/or configuration of the resource 122. The fee charged for a particular resource 122 might also be based upon the amount of time the resource 122 is utilized. For example, in the case of a data processing resource, like a virtual machine instance 120, the fee for use of the resource might be charged based upon the amount of time the resource is utilized. In the case of a data storage resource 122, the fee might be computed based upon the amount of data stored and/or the amount of data transferred into or out of the resource. The fees for other types of resources 122 might also be based upon other considerations. A service provider might also utilize various purchasing models to determine the amount to charge a customer for use of resources 122 provided by the service provider network 106. Details regarding several illustrative purchasing models utilized with certain types of resources 122 will also be described below with regard to FIG. 7.

The resources 122 described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs"), such as the Internet. In the environment shown in FIG. 1, a service provider might operate one or more data centers configured to provide the resources 122 in the service provider network 106 to its customers. Details regarding one implementation of a service provider network 106 will be provided below with regard to FIGS. 5 and 6.

The various resources 122 described above might also be provisioned and de-provisioned as needed in an automated fashion. For example, the service provider network 106 might instantiate a new instance of a computing resource 122, such a virtual machine instance 120, in order to execute program code 110 from the program code marketplace 102. The customer may then be permitted to utilize the new instance of the virtual machine as desired. When the customer has finished using the virtual machine instance, the virtual machine instances 120 may be de-provisioned. Other types of computing resources 122 might also be provisioned and de-provisioned in a similar manner in order to execute program code 110 from the program code marketplace 102. The service provider network 106 might also provide functionality for automatically scaling and/or de-scaling resources 122 based upon demand for the resources 122 or other factors.

A customer 114 or potential customer of a service provider might utilize a customer computing system (not shown in FIG. 1) to communicate with the service provider network 106 over a network 128. In this way, a customer computing system may be utilized to configure various aspects of the operation of the computing resources 122 and to utilize the program code 110. For example, and without limitation, a customer computing system may be utilized to purchase computing resources 122 in the service provider network 106, to configure aspects of the operation of the computing resources 122, and to perform other types of functionality with regard to the operation of the computing resources 122. The customer computing system 106 may be any type of computing device capable of connecting to the service provider network 106 via a suitable network 128 such as, but not limited to, a laptop or desktop computer, a tablet computing device, a server computer, or a mobile telephone.

As discussed briefly above, program code 110 offered through the program code marketplace 102 may have an associated execution environment definition 112. The execution environment definition 112 defines aspects of an execution environment 118 in the service provider network 106 that may be utilized to execute the program code 110. For example, and without limitation, the execution environment definition 112 may define a configuration for one or more hardware devices or virtual machine instances 120 utilized to execute the program code 110, one or more other computing resources 122 utilized by the program code 110, one or more network services 124 utilized by the program code 110, one or more other programs utilized by the program code 110, a network configuration for the execution environment 118 and, potentially, configuration information defining the configuration of other types of components upon which execution of the program code 110 is dependent.

As also discussed briefly above, a request may be received to deploy program code 110 from the program code marketplace 102 to the service provider network 106 for execution. For example, and without limitation, a customer 114 may purchase program code 110 from the program code marketplace 102 and request to deploy the purchased program code 110 to the service provider network 106 for execution. In some embodiments, a customer 114 might be permitted to deploy program code 110 to the service provider network 106 prior to purchasing the program code 110 in order to test aspects of the operation of the program code 110 in the service provider network 106. In the example shown in FIG. 1, for instance, a customer 114 has purchased the program code 110A and requested that the program code 110A be deployed to the service provider network 106 for execution.

In response to receiving a request to deploy program code 110 offered through the program code marketplace 102 to the service provider network 106, the execution environment definition 112 associated with the program code 110 may be utilized to create a suitable execution environment 118 in the service provider network 106 for the program code 110. For example, and without limitation, virtual machine instances 120 may be configured and instantiated, network services 124 may be configured, software may be installed, network configuration may be performed, and other types of computing resources 122 may be created and configured pursuant to the execution environment definition 112. The program code 110 may then be deployed to the execution environment 106 for execution. In the example shown in FIG. 1, for instance, one or more deployment systems 116 within the service provider network 106 have utilized the execution environment definition 112A associated with the program code 110A to create the execution environment 118. The program code 110A has also been deployed to the virtual machine instances 120 created in the execution environment 118 for execution.

Once the execution environment 118 has been created in the service provider network 106 and the program code 110 has been deployed to the execution environment 118, the program code 110 may be executed. For example, and without limitation, the program code 110 may be executed in the execution environment 118 to test the execution of the program code 110 and/or to test the suitability of the program code 110 to perform a certain task. The program code 110 might also be executed in order to process production network traffic. The program code 110 might also be utilized for other purposes. The customer 114 deploying the program code 110 may access the execution environment 118 to perform additional configuration operations, monitor the execution of the program code 110, and/or to perform other tasks.

In some implementations, the program code marketplace 102 is configured to interoperate with other systems, such as a payments system 126. The payments system 126 provides functionality for processing payments made by customers 114 for program code 110 purchased through the program code marketplace 102. In these embodiments, the program code marketplace 102 may be configured to permit micropayments for program code 110 available through the program code marketplace 102. Micropayments are payments that are very small, such as payments that are under one dollar. The program code marketplace 102 might also interoperate with other systems to provide other types of functionality in other embodiments. Additional details regarding the configuration and operation of the program code marketplace 102 and the interaction between the program code marketplace 102 and the service provider network 106 will be provided below with regard to FIGS. 2-4.

Figure 2:
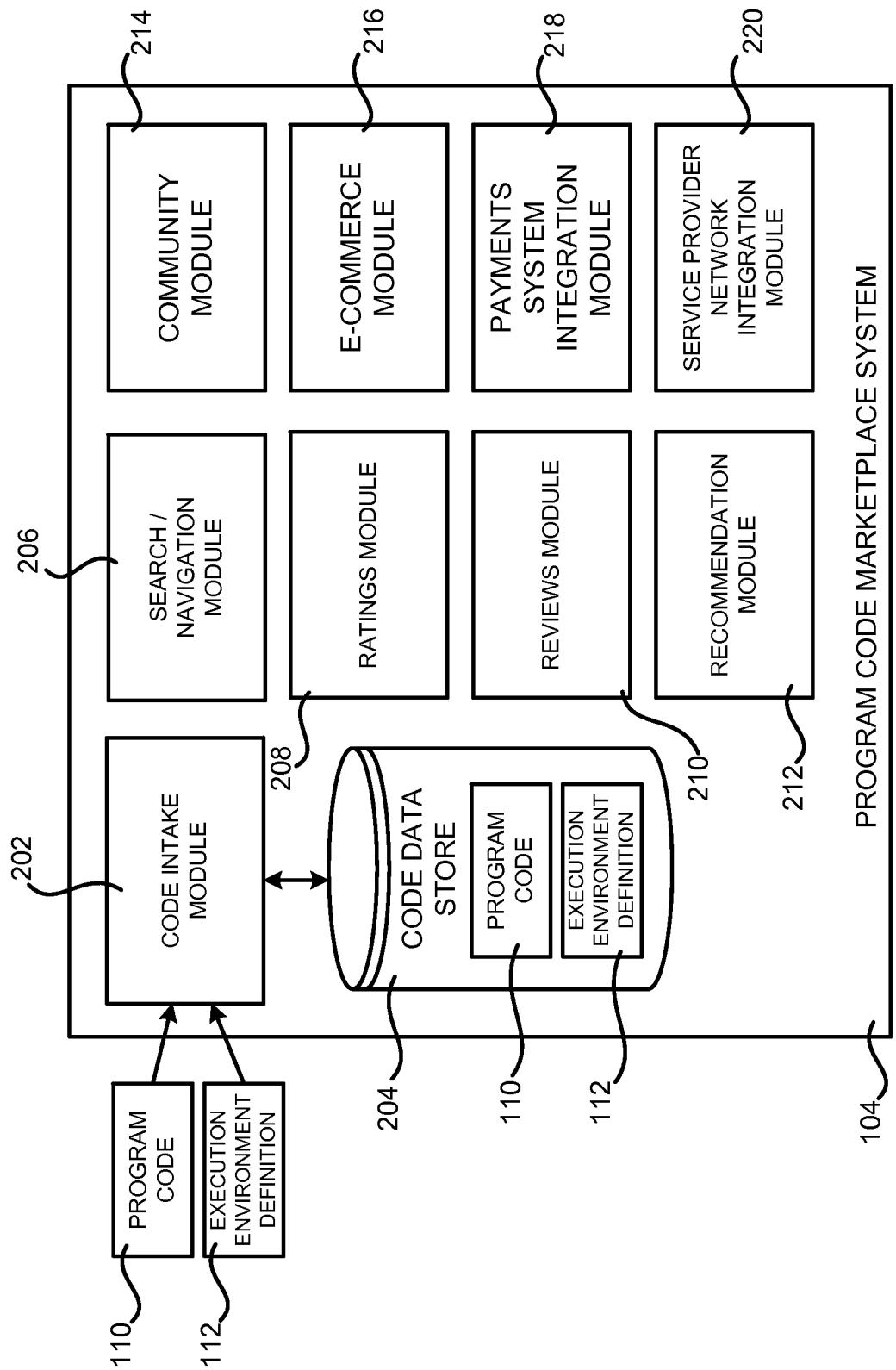
FIG. 2 is a system architecture diagram showing additional aspects of the configuration and operation of a program code marketplace configured for integration with a service provider network, according to one embodiment.

FIG. 2 is a system architecture diagram showing additional aspects of the configuration and operation of a program code marketplace system 104 configured for integration with a service provider network 106, according to one embodiment. As discussed briefly above, developers 108 and other users can submit program code 110 to the program code marketplace system 104 for inclusion in the program code marketplace 102. In order to provide this functionality, computing systems in the program code marketplace system 104 may be configured to execute a code intake module 202 in some embodiments.

The code intake module 202 may be configured to provide an appropriate user interface, application programming interface ("API"), or other type of interface for receiving program code 110 from the developers 108. The code intake module 202 might also receive the execution environment definition 112 for the supplied program code 110. The code intake module 202 might also receive other types of information associated with received program code 110, such as documentation, unit tests for testing the operation of the program code 110, metadata describing the program code 110, and other types of supporting materials. The code intake module 202 may then store the received program code 110, execution environment definition 112, and other materials in an appropriate data store, such as the code data store 204 illustrated in FIG. 2.

The code intake module 202 might also perform and/or coordinate the various processes described briefly above for vetting program code 110 that has been received for submission to the marketplace 102. For example, and without limitation, the code intake module 202, or another module, might perform processes for compiling and executing the program code 110 to perform tests on the executing code prior to inclusion in the marketplace 102, processes for security testing the program code 110, virus scanning of the program code 110, static and/or dynamic code analysis of the program code 110 to identify "bugs" in the program code 110 or other issues, style/format checking for program code 110 expressed as source code, and/or other automated processes for identifying potential execution problems and/or security risks associated with program code 110. As mentioned above, some or all of these processes might be performed at code intake time, at deployment time, and/or at another time.

If program code 110 fails any of the various processes described above, the code intake module 202 may provide a report to the developer 108 that submitted the program code 110. The report might indicate the identified problems with the program code 110 and also provide suggestions as to how the program code 110 might be revised in order to address the problem, or problems. The developer 108 may then revise the program code 110 and resubmit the program code 110 to the marketplace 102 at a future time. In some embodiments, developers 108 that meet certain requirements for program quality might be assigned a "badge" or other indication that is displayed to customers 114 when browsing the marketplace 102.

In order to allow customers 114 of the program code marketplace 102 to discover available program code 110, the program code marketplace system 104 might also execute a search/navigation module 206 in one embodiment. The search/navigation module 206 may be configured to index the program code 110 stored in the code data store 204 and to provide various types of user interfaces for searching, navigating, and otherwise discovering program code 110 available through the program code marketplace 110. For example, and without limitation, customers 114 might be permitted to search the available program code 110 using keywords and/or to navigate available program code 110 by task, use case, language, and/or other metadata associated with the program code 110. In this way, customers 114 of the program code marketplace 102 can browse and search the available program code 110.

In some embodiments, the program code marketplace system 104 is also configured to execute a ratings module 208. The ratings module 208 allows customers 114 of the program code marketplace 102 to submit ratings for program code 110 purchased from the program code marketplace 102. The customers 114 might also be permitted to supply ratings for developers 108 of program code 110 purchased from the program code marketplace 102. For example, and without limitation, customers 114 might be permitted to provide a numerical rating (e.g. one to five stars) or another type of rating for program code 110 and/or a developer 108. Customers might also be permitted to supply other types of ratings in other implementations. The ratings module 208 might also generate rankings for program code 110 and/or developers 108 based upon other criteria, such as the volume of sales, volume of page views, and/or other criteria.

The ratings module 208 might also be configured to cause ratings for program code 110 and/or developers 108 to be presented to customers 114 while browsing program code 110 available through the program code marketplace 102. In this way, potential customers 114 can be provided with information regarding the previous ratings for program code 110 and/or developers 108. The ratings may be utilized to identify highly rated developers 108 working in a particular technology area, for instance. The ratings received by the ratings module 208 might also be utilized in other ways in other embodiments.

The program code marketplace system 104 might also be configured to execute a reviews module 210. The reviews module 210 is configured to receive reviews of program code 110 and/or developers 108 from customers 114 of the program code marketplace 102. The collected reviews may be stored, indexed, and presented to customers 114 while browsing program code 110 available through the program code marketplace 102.

The program code marketplace system 104 might also be configured to execute a recommendation module 212. The recommendation module 212 may be configured to recommend program code 110 and/or one or more developers 108 to a customer 114 of the program code marketplace 102. In order to provide the recommendations, the recommendation module 212 might utilize information associated with a customer 114, such as a purchase history and/or a user profile, along with other information, such as the ratings and reviews described above, to generate a recommendation. Other information might also be utilized to recommend program code 110 and/or a developer 108 to a customer of the program code marketplace 102. For example, and without limitation, the volume of sales, volume of usage, number of views, other types of customer 114 satisfaction data, and other information might also be utilized to recommend program code 110 and/or developers 108 to customers 114 of the program code marketplace 102.

The program code marketplace system 104 might also be configured to execute a community module 214. The community module 214 is configured to provide various types of online communities in which developers 108 and/or customers 114 of the program code marketplace 102 can discuss program code 110. For example, and without limitation, the community module 214 might provide online forums, chat rooms, social networks and/or other types of online communities for discussing program code 110 available through the program code marketplace 102. Other types of online communities not specifically disclosed herein might also be provided.

In some implementations, one or more online communities are provided through which customers 114 may post details regarding a coding problem. An interested developer 108 might offer to create a solution to the stated problem for a specified price. If the developer 108 creates program code 110 that provides a solution to the problem, the customer 114 might pay the developer 108 for their work through the program code marketplace 102. For example, a micropayment might be paid to the developer 108 for creating the program code 100 that solves the stated coding problem.

The program code marketplace system 104 might also be configured to execute an e-commerce module 216. The e-commerce module 216 provides e-commerce functionality for the program code marketplace 102. For example, and without limitation, the e-commerce module 216 might provide an online shopping cart and checkout functionality to customers 114 of the program code marketplace 102. The e-commerce module 216 might also utilize functionality provided by a payments system integration module 218 in order to process customer 114 payments through a payments system 126. As discussed briefly above, the payments system integration module 218 might be configured to process micropayments for program code 110 purchase through the program code marketplace 102. Other types of payments might also be processed.

The program code marketplace system 104 might also be configured to execute a service provider network integration module 220. The service provider network integration module 220 provides functionality for integrating with the deployment systems 116 and/or other components within the service provider network 106 in order to create and configure an execution environment 118 for program code 110 obtained from the program code marketplace 102. The service provider network integration module 220 might also provide other types of functionality for integrating the operation of the program code marketplace system 104 with the service provider network 106.

It should be appreciated that the configuration of the program code marketplace system 104 shown in FIG. 2 has been simplified for discussion purposes. The program code marketplace system 104 might include many more hardware and software components than illustrated in FIG. 2 and described above. Additionally, the program code marketplace system 104 might include many other components, such as networks, networking components, data stores, and other components than those specifically identified herein. In some embodiments, the functionality described herein as being provided by the program code marketplace system 104 is implemented by components in the service provider network 106. Additional details regarding the operation of the program code marketplace system 104 will be provided below with regard to FIGS. 3A-8.

Figure 3A:
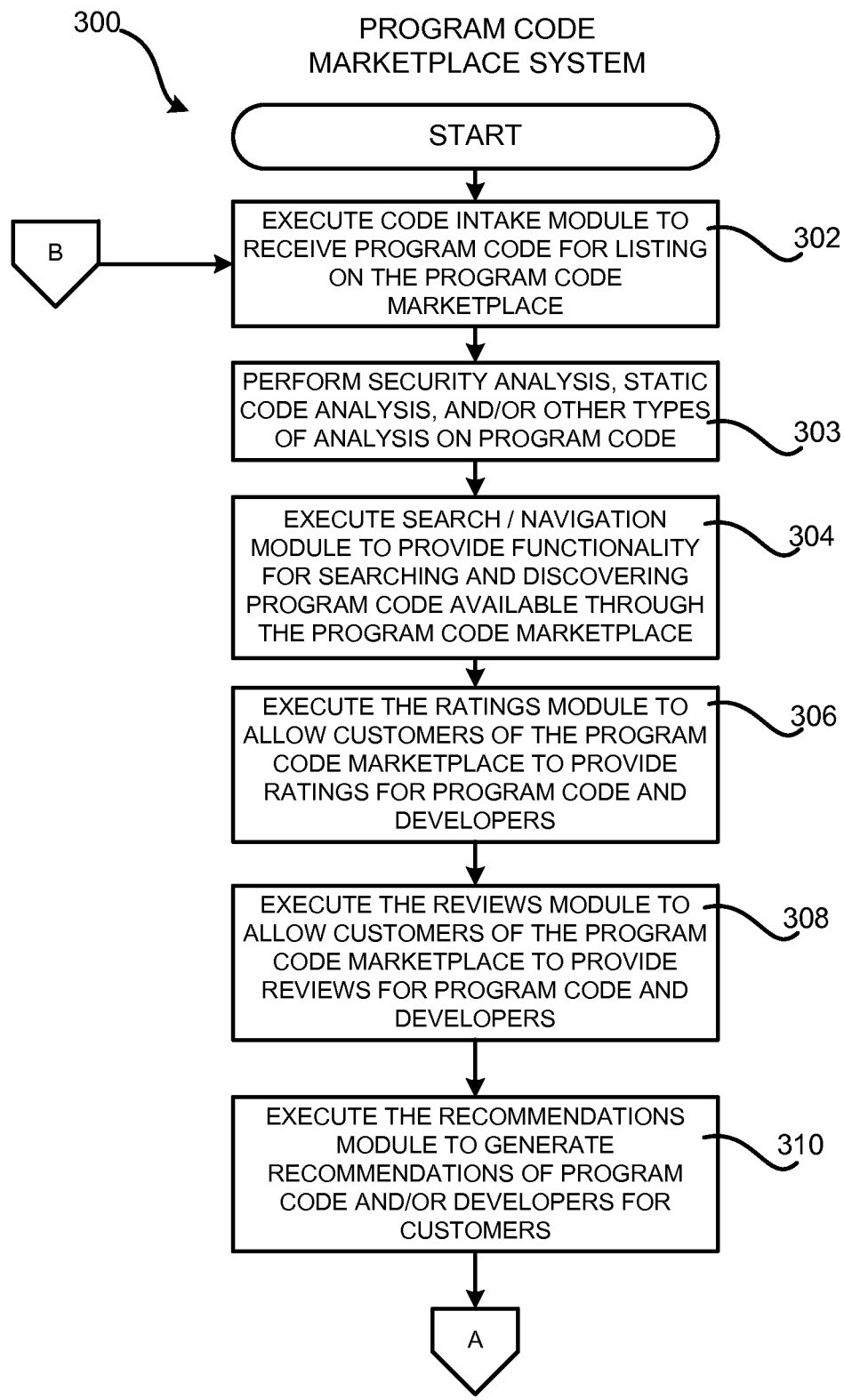
FIGS. 3A-3B are flow diagrams illustrating aspects of the operation of a program code marketplace that is configured for integration with a service provider network, according to one embodiment disclosed herein.
Figure 3B:
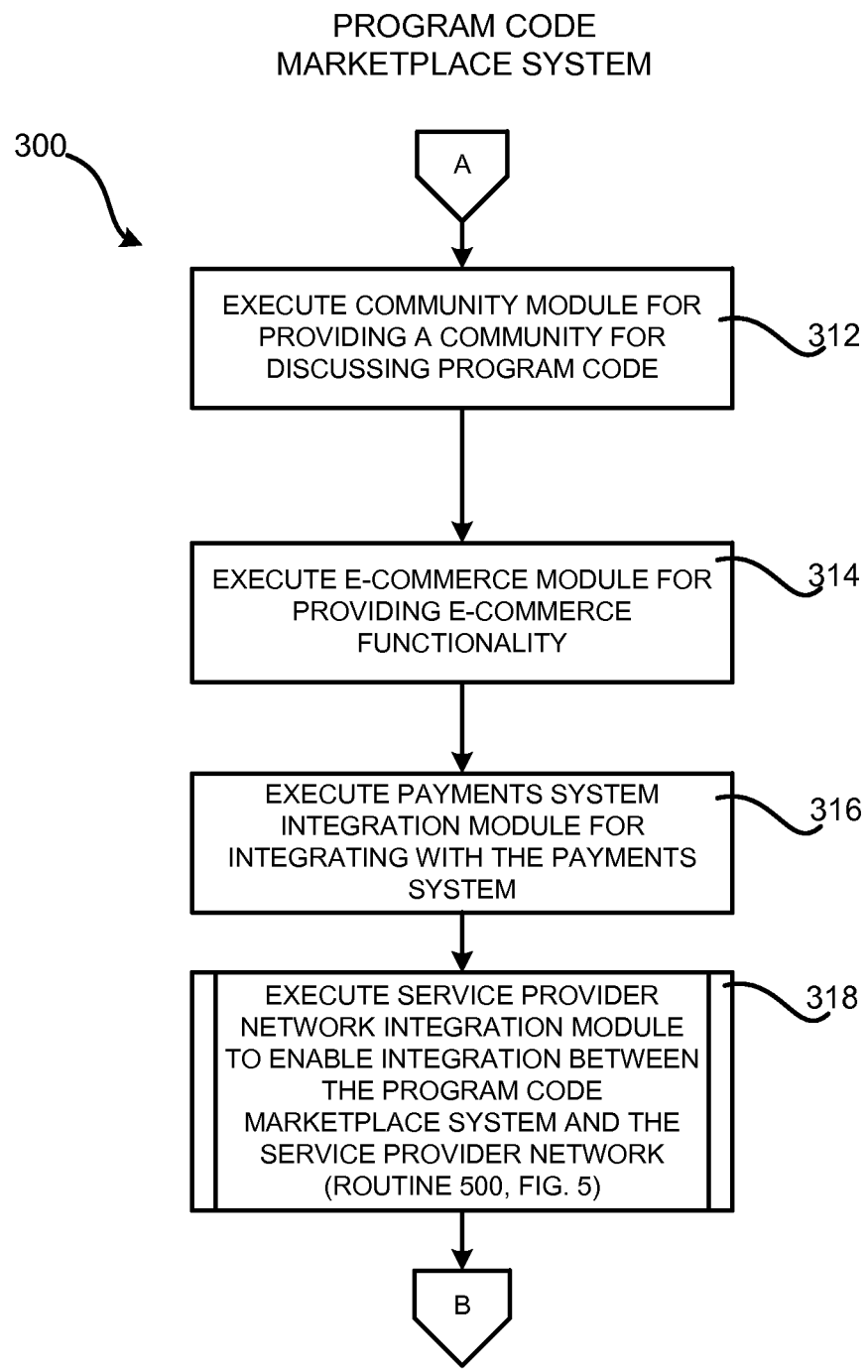

FIGS. 3A-3B are flow diagrams showing a routine 300 that illustrates aspects of the operation of a program code marketplace 102 that is configured for integration with a service provider network 106, according to one embodiment disclosed herein. It should be appreciated that the logical operations described herein with respect to FIGS. 3A-3B, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the program code marketplace system 104 executes the code intake module 202 to receive program code 110 for listing on the program code marketplace 102 from the developers 108. As discussed above, the code intake module 202 might also receive an execution environment definition 112 for program code 110 submitted to the program code marketplace 102. As discussed in greater detail below, the service provider network integration module 220 may utilize the execution environment definition 112 to create an execution environment 118 for the program code 110 in the service provider network. 106. As also discussed above, the code intake module 202 might also receive and store other items with received program code 110 such as, but not limited to, documentation, unit tests, and other data.

From operation 302, the routine 300 proceeds to operation 303, where the code intake module 202, or another module or component, may perform various types of analyses on the received program code 110 to determine whether the program code 110 is suitable for inclusion in the marketplace 102. For example, and as discussed above, the code intake module 202 might perform a security analysis, virus checking, static and/or dynamic code analysis, style/formatting checking, and/or other types of processes on the received program code 110. If the program code 110 meets certain quality requirements, then the program code 110 may be listed in the marketplace 102. If the program code 110 fails one or more of the analyses, the program code 110 may not be listed in the marketplace 102. As mentioned above, a report might also be provided to the developer 108 that submitted the program code 110 identifying the issue, or issues, with the program code 110 and providing suggestions as to how the issues may be resolved.

From operation 303, the routine 300 proceeds to operation 304, where the program code marketplace system 104 executes the search/navigation module 206 to provide functionality for searching the code data store 204. The search/navigation module 206 might also provide other types of functionality for browsing and discovering program code 110 of interest stored in the code data store 204 and available through the program code marketplace 102.

From operation 304, the routine 300 proceeds to operation 306, where the program code marketplace system 104 executes the ratings module 208 to allow customers 114 of the program code marketplace 102 to submit ratings for program code 110 purchased from the program code marketplace 102. The customers 114 might also be permitted to supply ratings for developers 108 of program code 110 purchased from the program code marketplace 102. As mentioned above, for example, customers 114 might be permitted to provide a numerical rating (e.g. one to five stars) or another type of rating for program code 110 or a developer 108. The ratings module 208 might also be configured to cause ratings for program code 110 and/or developers 108 to be presented to customers 114 while browsing program code 110 available through the program code marketplace 102.

From operation 306, the routine 300 proceeds to operation 308, where the program code marketplace system 104 executes the reviews module 210 to receive reviews of program code 110 and/or developers 108 from customers 114 of the program code marketplace 102. As discussed above, the collected reviews may be stored, indexed, and presented to customers 114 while browsing program code 110 available through the program code marketplace 102.

From operation 308, the routine 300 proceeds to operation 310, where the program code marketplace system 104 executes the recommendation module 212 in order to recommend program code 110 and/or one or more developers 108 to a customer 114 of the program code marketplace 102. As discussed above, the recommendation module 212 might utilize information associated with a customer 114, such as a purchase history and/or a user profile, along with other information, such as the ratings and reviews described above, to generate a recommendation. Other information might also be utilized to recommend program code 110 and/or a developer 108 to a customer 114 of the program code marketplace 102.

From operation 310, the routine 300 proceeds to operation 312, where the program code marketplace system 104 executes the community module 214. As discussed briefly above, the community module 214 is configured to provide various types of online communities in which developers 108 and/or customers 114 of the program code marketplace 102 can discuss program code 110. For example, and without limitation, the community module 214 might provide online forums, chat rooms, social networks and/or other types of online communities for discussing program code 110 available through the program code marketplace 102. Other types of online communities not specifically disclosed herein might also be provided.

From operation 312, the routine 300 proceeds to operation 314, where the program code marketplace system 104 executes the e-commerce module 216. As discussed above, the e-commerce module 216 provides e-commerce functionality for the program code marketplace 102. For example, and without limitation, the e-commerce module 216 might provide an online shopping cart and checkout functionality to customers 114 of the program code marketplace 102. The e-commerce module 216 might also integrate with a payments system integration module 218 in order to process customer 114 payments through a payments system 126. Other types of e-commerce functionality might also be provided.

From operation 314, the routine 300 proceeds to operation 316, where the program code marketplace system 104 executes the payments system integration module 218. As discussed briefly above, the payments system integration module 218 provides functionality for utilizing the payments system 126 to process customer 114 payments for program code 110 purchased through the program code marketplace 102. As discussed briefly above, the payments system integration module 218 might be configured to process micropayments for program code 110 purchased through the program code marketplace 102. Other types of payments might also be processed in a similar manner.

From operation 316, the routine 300 proceeds to operation 318, where the program code marketplace system 104 executes the service provider network integration module 220. As discussed briefly above, the service provider network integration module 220 provides functionality for integrating with the deployment systems 116 and/or other components within the service provider network 106 in order to create and configure an execution environment 118 for program code 110 available from the program code marketplace 102. Additional details regarding this process will be provided below with regard to FIG. 4. From operation 318, the routine 300 proceeds back to operation 302, where the operations described above may be repeated.

Figure 4A:
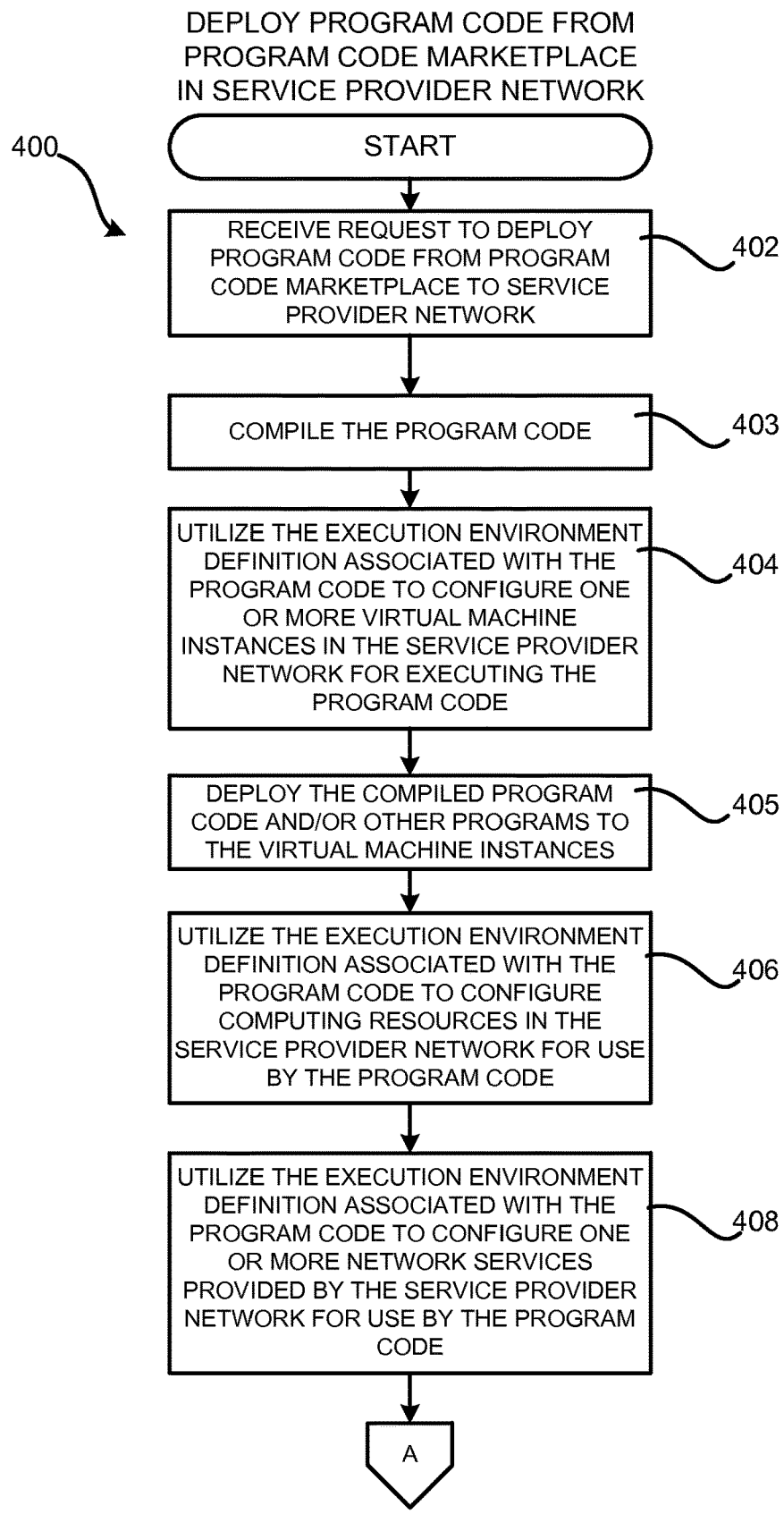
FIGS. 4A-4B are flow diagrams illustrating aspects of one mechanism disclosed herein for configuring an execution environment in a service provider network for executing program code provided by a program code marketplace, according to one embodiment disclosed herein.
Figure 4B:
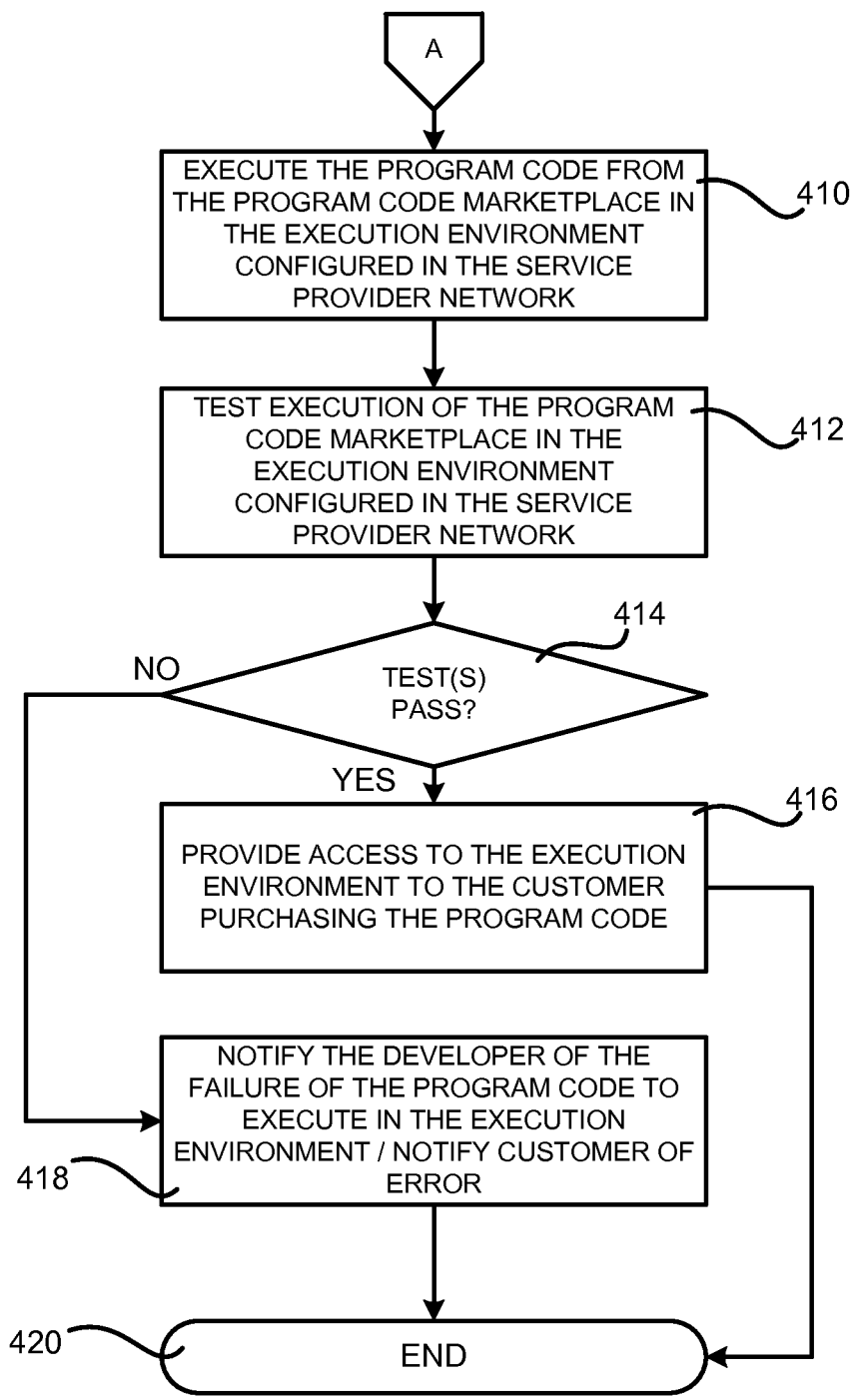

FIGS. 4A-4B are flow diagrams showing a routine 400 that illustrates aspects of one mechanism disclosed herein for configuring an execution environment 118 in a service provider network 106 for executing program code 110 provided by a program code marketplace 102, according to one embodiment disclosed herein. The routine 400 begins at operation 402, where a request is received to deploy program code 110 from the program code marketplace 102 to the service provider network 106. As mentioned above, for example, a customer 114 may purchase program code 110 from the program code marketplace 102 and request to deploy the purchased program code 110 to the service provider network 106 for execution. In some embodiments, a customer 114 might be permitted to deploy program code 110 from the program code marketplace 102 to the service provider network 106 prior to purchasing the program code 110 in order to test aspects of the operation of the program code 110.

In response to receiving a request to deploy program code 110 offered through the program code marketplace 102 to the service provider network 106, the routine 400 proceeds from operation 402 to operation 403, where the program code 110 is compiled if the program code has been provided to the program code marketplace 102 in source code form. If the program code 110 has been provided in an executable form, it may not be necessary to compile the program prior to deployment to the service provider network 106. The service provider network integration module 220 and/or another module or component may coordinate the compilation of the program code 110 if necessary. Once the program code 110 has been compiled, the routine 400 proceeds from operation 403 to operation 404.

At operation 404, the service provider network integration module 220 provides the execution environment definition 112 for the program code 110 to be executed to the deployment systems 116 in the service provider network 106. In turn, the deployment systems 116 in the service provider network 106 utilize the execution environment definition 112 to configure one or more virtual machine instances 120 in the service provider network 106 for executing the program code 110. In this regard, the execution environment definition 112 might specify various aspects of the virtual machine instances 120 including, but not limited to, a hardware configuration, an operating system to be utilized by the virtual machine instances 120, other program code to be installed in the virtual machine instances 120, and/or other aspects of the configuration and operation of the virtual machine instances 120. The program code 110 is also deployed to the virtual machine instances 120 in a similar fashion. Dedicated hardware computing devices might be utilized to execute the program code 110 instead of virtual machine instances 120. In these embodiments, the configuration of the hardware computing devices might be performed in a similar fashion.

From operation 404, the routine 400 proceeds to operation 4065, where the compiled program code 110 and any other programs specified by the execution environment definition 112 are deployed to the virtual machine instances 120 created and configured at operation 404. The routine 400 then proceeds to operation 406, where the deployment systems 116 may utilize the execution environment definition 112 to configure other types of computing resources 122 in the execution environment 118. For example, and without limitation, the deployment systems 116 may configure database resources, file or block data storage resources, and/or networking resources, such as load balancing resources, DNS resources, VPC resources, VLAN resources, and/or other types of hardware and software computing resources 122 for use by the program code 110.

From operation 406, the routine 400 proceeds to operation 408, where the deployment systems 116 may utilize the execution environment definition 112 to configure one or more network services 124 for use by the program code 110. For example, and without limitation, the deployment systems 116 might configure network services 124 provided by the service provider network 106 for implementing data storage services, database services, auto-scaling services, map/reduce services, workflow services, queue services, search services, notification services, email services, transcoding services, and other types of services not specifically identified herein.

It should be appreciated that other types of configuration might be performed on the execution environment 118. For example, and without limitation, other types of software might be installed, configured, and executed in the virtual machine instances 120 such as, but not limited to, programming tools, libraries, application containers, and frameworks. Additionally, other types of networking services and components might also be defined and/or configured. Additionally, access control lists and other security mechanisms might be configured. Other types of configuration might also be performed prior to executing the program code 110 in the execution environment 118.

Once the execution environment 118 has been created and configured, the routine 400 proceeds from operation 408 to operation 410, where the program code 110 is executed in the execution environment 118. Once the program code 110 is execution, the routine 400 proceeds to operation 412, where various types of tests might be performed to ensure that the program code 110 is executing properly in the created execution environment 118. If the program code 110 passes the tests, the routine 400 proceeds from operation 414 to operation 416, where the customer 114 that purchased the program code 110 is given access to the execution environment 118. The program code 110 might then be utilized in the execution environment 118 to service production network traffic or to perform other processing tasks as desired by the customer 114.

If, at operation 414, it is determined that the program code 110 has failed one or more of the tests performed at operation 412, then the routine 400 proceeds to operation 418. At operation 418, a notification might be provided to the developer 108 that supplied the program code 110 to the marketplace 102 that execution of the program code 110 has failed. Additionally, a notification might be provided to the customer 114 that purchased the program code 110 indicating that deployment and execution of the program code 110 has failed. From operations 416 and 418, the routine 400 proceeds to operation 420, where it ends.

It should be appreciated that, in various embodiments, a customer 114 of the program code marketplace 102 might select multiple programs for execution in the service provider network 106. For example, a customer 114 might select the program code 110A, 110B and 110C to be executed together in the service provider network 106. In this example, the selected program code 110A, 110B and 110C might be deployed to the same virtual machine instances 120 and executed together to provide a particular solution. In some embodiments, the program code marketplace 102 is configured to provide a discount on the purchase price when multiple programs are purchased together. Other incentives might also be provided for purchasing program code 110 in bulk.

It should also be appreciated that customers 114 of the program code marketplace 102 might be permitted to customize the execution environment definition 112 for program code 110 available from the program code marketplace 102 in various ways. Customers 114 might also be permitted to define a completely new execution environment definition 112 for program code 110 available from the program code marketplace 102. Customers 114 might similarly be permitted to select from a predefined selection of execution environment definitions 112. Customers 114 might also be permitted to define and/or customize execution environment definitions 112 in other ways not specifically identified herein.

Figure 5:
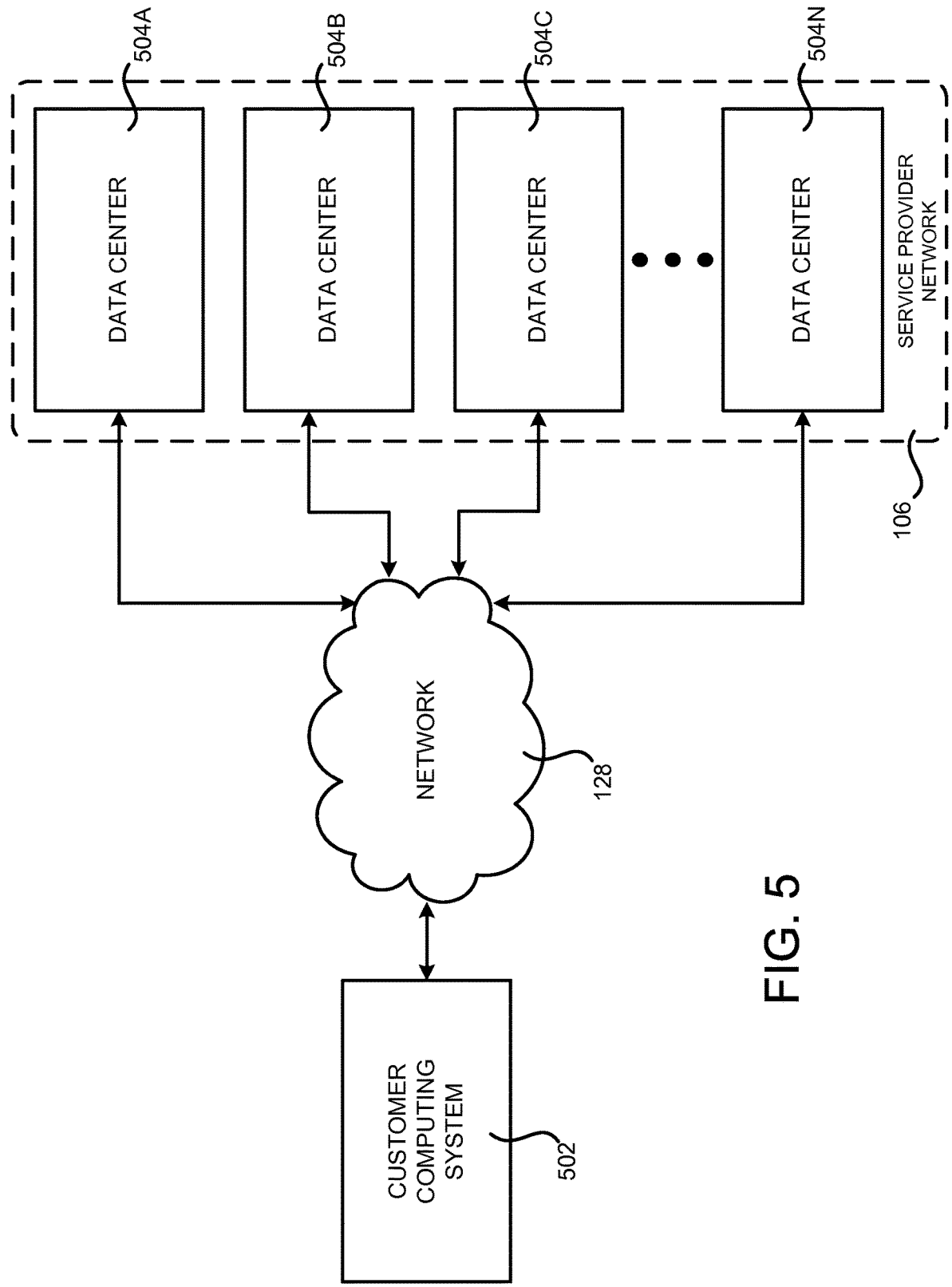
FIG. 5 is a system and network diagram that shows one illustrative operating environment for the embodiments disclosed herein that includes a service provider network that may be configured to provide the functionality described herein for integrating with a program code marketplace.

FIG. 5 is a system and network diagram that shows one illustrative operating environment for the embodiments disclosed herein that includes a service provider network 106 that may be configured to integrate with a program code marketplace system 104 in the manner described above, according to one embodiment disclosed herein. As discussed briefly above, the service provider network 106 can provide computing resources 122 on a permanent or an as-needed basis.

The computing resources 122 provided by the service provider network 104 may include various types of computing resources, such as data processing resources, data storage resources, networking resources, data communication resources, and the like. Each type of computing resource may be general-purpose or may be available in a number of specific configurations. For example, and as described briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 106 might also be configured to provide various network services 124. Additional details regarding some types of computing resources that may be offered for use through a service provider network 106 will be provided below with regard to FIG. 8.

The computing resources 122 provided by the service provider network 106 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for integrating a program code marketplace 102 with a service provider network 106 will be described below with regard to FIG. 7.

The customers and other users of the service provider network 106 may access the computing resources provided by the service provider network 106 over a network 128, such as a WAN. For example, and without limitation, a customer computing system 502 might be utilized to access the service provider network 106 by way of the network 128. It should be appreciated that a local-area network ("LAN"), the Internet, or any other networking topology known in the art that connects the data centers 504 to remote customers and other users may be utilized. It should also be appreciated that combinations of such networks might also be utilized.

Figure 6:
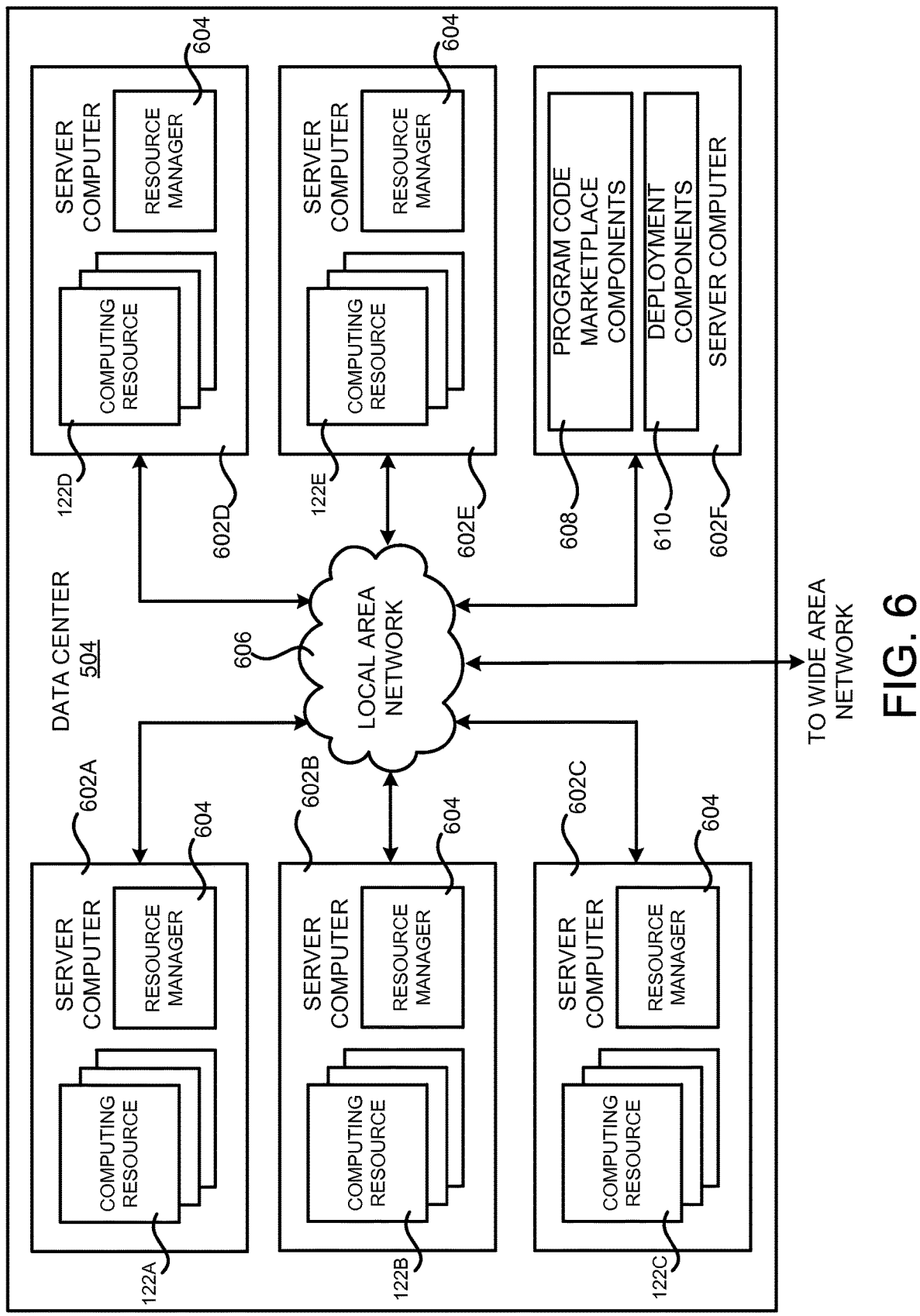
FIG. 6 is a computing system diagram that illustrates one configuration for a data center that implements aspects of the concepts and technologies disclosed herein for integrating a program code marketplace and a service provider network, according to one embodiment disclosed herein.

FIG. 6 is a computing system diagram that illustrates one configuration for a data center 402 that implements aspects of the concepts and technologies disclosed herein for integrating a program code marketplace 102 and a service provider network 106, according to one embodiment disclosed herein. The example data center 504 shown in FIG. 6 includes several server computers 602A-602F (which may be referred to herein singularly as "a server computer 602" or in the plural as "the server computers 602") for providing computing resources 122.

The server computers 602 may be standard tower, rack-mount, or blade server computers configured appropriately for providing the computing resources 122 described herein. For example, in one implementation the server computers 602 are configured to provide the computing resources 122A-122E. As mentioned above, the computing resources 122 might be data processing resources such as virtual machine instances or hardware computing systems, data storage resources, database resources, networking resources, and others. Some of the servers 602 might also be configured to execute a resource manager 604 capable of instantiating and/or managing resources 122. In the case of virtual machine instances, for example, the resource manager 604 might be a hypervisor or another type of program configured to enable the execution of multiple virtual machine instances on a single server 602, for example. Server computers 602 in the data center 504 might also be configured to provide network services 124, such as those described above and potentially others.

The data center 504 shown in FIG. 6 also includes a server computer 602F that may be utilizes for executing some or all of the software components described above for providing integration between the program code marketplace and the service provider network 106. For example, and without limitation, the server computer 602F might be configured to execute one or more program code marketplace components 608 for providing the functionality described herein as being provided by the program code marketplace 102. The server computer 602F might also be configured to execute program components for providing some or all of the functionality described above as being provided by the service provider network 106, such as deployment components 610 for providing the functionality described above as being performed by the deployment system 116. The server computer 602F might also be configured to execute other components for providing some or all of the functionality described herein.

In the example data center 504 shown in FIG. 6, an appropriate LAN 606 is utilized to interconnect the server computers 602A-602F. The LAN 606 is also connected to the network 128 illustrated in FIG. 5. It should be appreciated that the configuration and network topology illustrated in FIGS. 1-6 has been greatly simplified and that many more computing systems, software components, networks, and networking devices may be utilized to interconnect the various computing systems disclosed herein and to provide the functionality described above. Appropriate load balancing devices or software modules might also be utilized for balancing a load between each of the data centers 504A-504N, between each of the server computers 602A-602F in each data center 504, and, potentially, between computing resources 122 in each of the data centers 504. It should be appreciated that the data center 504 described with respect to FIG. 6 is merely illustrative and that other implementations might be utilized.

Figure 7:
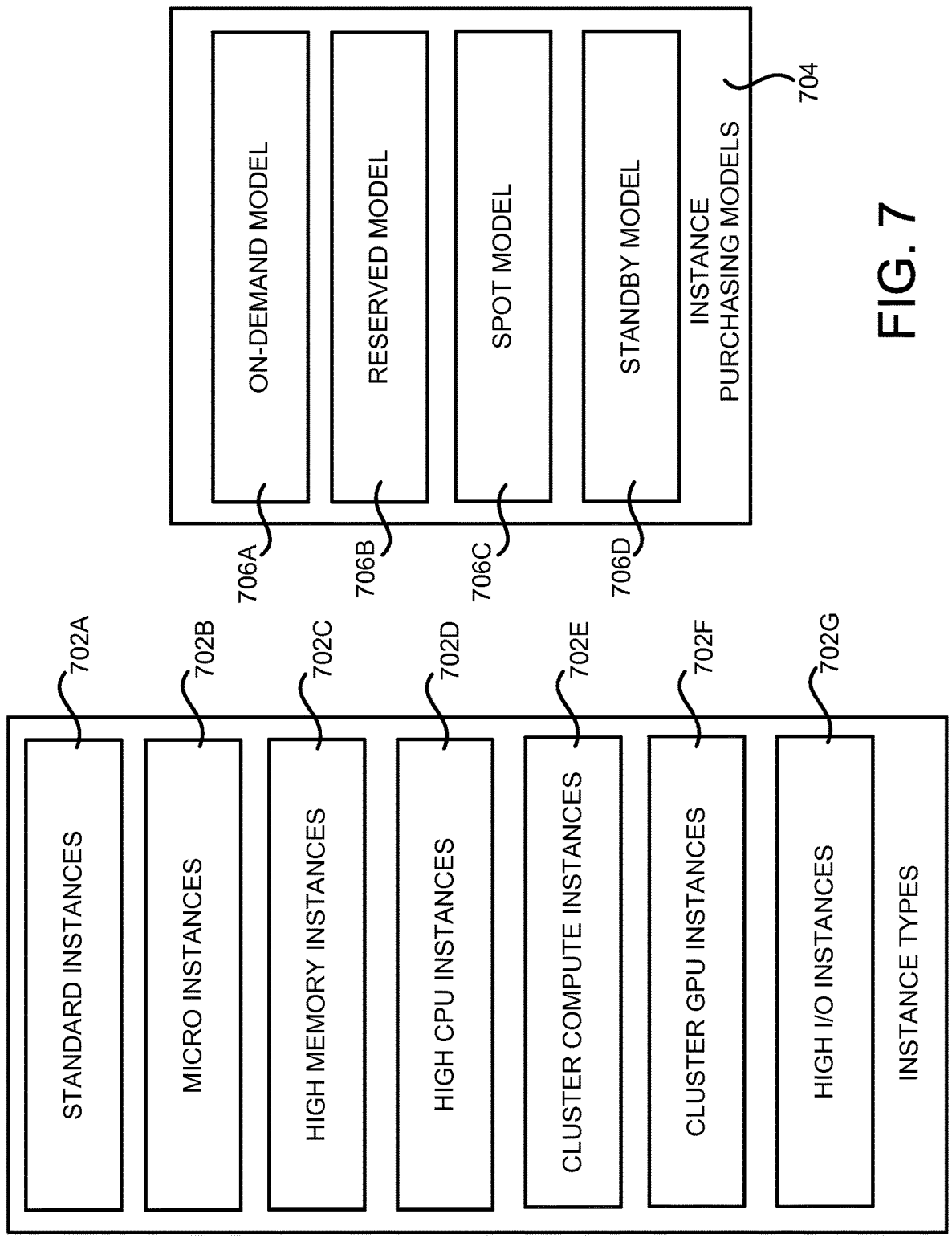
FIG. 7 is a block diagram showing aspects of various types of computing resources and purchasing models for the computing resources that might be provided by a computing service provider and utilized to execute program code provided by a program code marketplace.

FIG. 7 is a block diagram showing aspects of various types of computing resources 122 and purchasing models for the computing resources 122 that might be provided by a service provider network 106 and utilized in an execution environment 118 for program code offered through a program code marketplace 102 in embodiments disclosed herein. As described briefly above, one example of the computing resources 122 that might be provided by a service provider network 106 are data processing resources, such as virtual machine instances 120. The virtual machine instances 120 provided by the service provider network 106 may be made available to customers in a number of different types, or configurations. FIG. 7 illustrates several example instance types that might be made available by a service provider through a service provider network 106: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances 702A are instances that are configured with generally proportional amounts of CPU and memory. Standard instances 702A may be suitable for common computing applications. Standard instances 702A may be made available in various sizes in some embodiments. For example, "small", "medium", "large", and "extra large" instances may be made available, with each of these instances having greater amounts of CPU and memory, while maintaining approximately similar ratios of CPU to memory.

Micro instances 702B are instances that provide a small amount of consistent CPU resources and allow CPU capacity to be increased in short bursts when additional cycles are available. Micro instances 702B may be suited for lower throughput applications and Web sites that require additional compute cycles periodically.

High memory instances 702C are instances that have proportionally more random access memory ("RAM") resources than CPU resources. High memory instances 702C may be suitable for high throughput applications, including database and memory caching applications. In contrast, high CPU instances 702D have proportionally more CPU resources than RAM memory resources and are well suited for compute-intensive applications.

Cluster compute instances 702E are instances that offer proportionally high CPU resources with increased network performance. Cluster compute instances 702E are well suited for High Performance Compute ("HPC") applications and other demanding network-bound applications. Cluster GPU instances 702F are virtual machine instances that provide general-purpose GPUs with proportionally high CPU and increased network performance for applications benefitting from highly parallelized processing, including HPC, rendering and media processing applications. While cluster compute instances 702E provide the ability to create clusters of instances connected by a low latency, high throughput network, cluster GPU instances 702F provide an additional option for applications that can benefit from the efficiency gains of the parallel computing power of GPUs over what can be achieved with traditional processors.

High I/O instances 702G are instances that provide very high disk I/O performance and are suited for high performance database workloads and other jobs that require high disk performance. High I/O instances 702G may utilize solid state-drive ("SSD")-based local instance storage for high I/O throughput. High I/O instances 702G might also provide high levels of CPU, memory, and network performance. It should be appreciated that the various instance types described above are merely illustrative. Other instance types not described herein might be utilized with the various concepts and technologies described herein. Additionally, in some embodiments, virtual machine instances may be made available in various sizes having continuous ratios of CPU to memory.

It should also be appreciated that the various instance types described above might be utilized with various operating systems. For example, a customer of a service provider might request to execute a high CPU instance 702D executing the LINUX operating system. Similarly, a customer or other user of the service provider network 106 might request to use a cluster compute instance 702E executing the MICROSOFT WINDOWS SERVER operating system. Other operating systems might also be utilized.

As also shown in FIG. 7, the various instance types described above, and the other computing resources 122 described herein, might be priced according to various instance purchasing models 704. For instance, in the example shown in FIG. 7, computing resources 122 may be priced according to an on-demand model 706A, a reserved model 706B, a spot model 706C, and/or a standby model 706D. Aspects of each of these purchasing models are described in greater detail below.

Computing resources 122 priced according to the on-demand model 706A are resources that are paid for and in active use by a customer. The on-demand model 706A allows customers of a service provider to pay for capacity per unit of time, such as an instance-hour, without requiring a long-term commitment. This may free the customer from the costs and complexities of planning, purchasing, and maintaining hardware, and might effectively transform what are commonly large fixed costs into much smaller variable costs.

Computing resources 122 priced according to the reserved model 706B are computing resources 122 that are reserved for a customer in exchange for a payment. The reserved model 706B provides a customer the option to make a one-time payment for each resource 122 they want to reserve. In turn, the customer may receive a discount on the hourly usage charge for reserved computing resources 122 as compared to on-demand resources. After the customer makes the one-time payment for reserved computing resources 122, the reserved resources are reserved for the customer and the customer has no further obligation. The customer may choose to run the reserved resources 122 for the discounted usage rate for the duration of a chosen term. If the customer does not use the reserved resources, the customer will not pay usage charges on these resources 122.

The spot model 706C allows customers to bid on unused capacity in a service provider network 106. The customer can run the resources 122 priced according to the spot model 706C for as long as their bid exceeds a current market price, called the "spot market price". The spot market price may fluctuate based upon the supply of resources and the customer demand for the resources. Spot resources may be terminated if a customer's maximum bid no longer exceeds the current spot market price.

In order to obtain spot resources, a customer may place a request for spot resources that specifies the type and desired number of spot resources and the maximum price the customer is willing to pay. If the customer's maximum price bid exceeds the current spot market price for desired resources, the customer's request will be fulfilled and the customer's spot resources will run until either the customer chooses to terminate them or the spot market price increases above the customer's maximum price (whichever is sooner). Various components operating within the service provider network 106 may manage the market for the spot resources, including setting the current spot market price.

Computing resources 122 purchased according to the standby model 706D, which might be referred to as "standby resources", are resources 122 that have been acquired on behalf of a customer and that are made ready for near immediate use by the customer in the manner described herein. The price charged for standby resources is typically less than the price charged for on-demand resources, since the standby resources may be terminated in the same manner as spot resources. In one embodiment, standby resources are priced higher than spot resources and reserved resources, but lower than on-demand resources.

It should be appreciated that the various purchasing models 704 described above are merely illustrative and that other mechanisms may be utilized to set the pricing for the various types of computing resources 122 provided by a service provider network 106. It should also be appreciated that the embodiments disclosed herein may be utilized with any of the resource types and purchasing models 704 shown in FIG. 7 and other configurations of computing resources 122 and purchasing models 704 not shown in FIG. 7 or described herein. For example, and without limitation, the execution environment definition 112 for program code 110 offered through the program code marketplace 102 might specify any of the instance types described above and/or and of the instance purchasing models 704 for an execution environment 118 for the program code 110.

Additionally, it should be appreciated that other types of computing resources 122 might also be priced according to the purchasing models 704 shown in FIG. 7 or other purchasing models. As discussed above, the embodiments disclosed herein might also be utilized with other types of computing resources 122, such as data storage resources, database resources, networking resources, and others. These resources might also be available in various configurations, capacities, arrangements, and priced according to various purchasing models.

Figure 8:
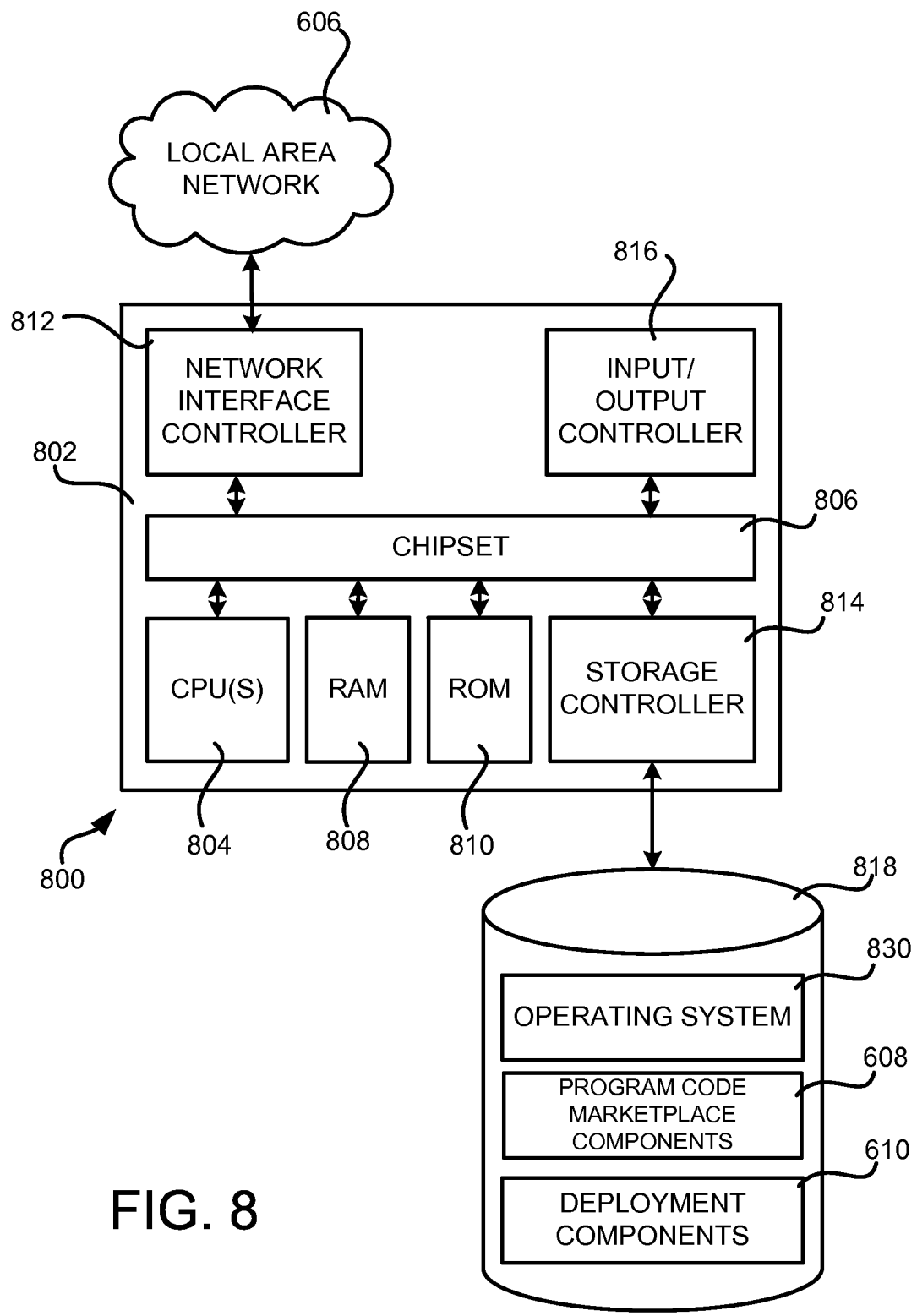
FIG. 8 is a computer architecture diagram showing an illustrative computer hardware architecture for implementing a computing device that might be utilized to implement aspects of the various embodiments presented herein.

FIG. 8 shows an example computer architecture for a computer 800 capable of executing program components for integrating a program code marketplace 102 with a service provider network 106 in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for providing the program code marketplace 102 and/or the service provider network 106, described above. The computer architecture shown in FIG. 8 might also be utilized to implement a customer computing system 502 or any other of the computing systems described herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 606. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as the program code marketplace components 608, the deployment components 610, and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 3A, 3B and 4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for integrating a program code marketplace and a service provider network have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   receive program code and an associated execution environment definition, the associated execution environment definition defining a suitable execution environment for the program code by providing configuration information for the suitable execution environment;
   perform one or more first tests on the program code;
   determine that the program code passed the one or more first tests;
   include the program code in a program code marketplace;
   receive a request from a user to deploy the program code from the program code marketplace to a service provider network;
   in response to receiving the request, utilize the associated execution environment definition to create the suitable execution environment for the program code in the service provider network;
   deploy the program code from the program code marketplace to the suitable execution environment in the service provider network;
   cause the program code to execute in the suitable execution environment created in the service provider network;
   perform one or more second tests of the program code in the suitable execution environment created in the service provider network;
   determine that the program code in the suitable execution environment passed the one or more second tests; and
   provide, to the user, access to the program code in the suitable execution environment.

2. The non-transitory computer-readable storage medium of claim 1, wherein the suitable execution environment comprises one or more virtual machine instances, and wherein the suitable execution environment definition provides the configuration information for the one or more virtual machines instances.

3. The non-transitory computer-readable storage medium of claim 1, wherein the suitable execution environment comprises one or more computing resources, and wherein the suitable execution environment definition provides the configuration information for the one or more computing resources.

4. The non-transitory computer-readable storage medium of claim 1, wherein the suitable execution environment comprises one or more network services, and wherein the suitable execution environment definition provides the configuration information for the one or more network services.

5. The non-transitory computer-readable storage medium of claim 1, wherein the suitable execution environment comprises one or more other programs, and wherein the suitable execution environment definition specifies at least one program of the one or more of the other programs.

6. The non-transitory computer-readable storage medium of claim 1, wherein the configuration information specifies a configuration of at least one of the following: hardware devices, virtual machine instances, computing resources, network services, other programs, network configurations, database resources, data storage resources, load balancing resources, DNS resources, VPC resources, VLAN resources, auto-scaling services, workflow services, queue services, search services, notification services, email services, or transcoding services.

7. The non-transitory computer-readable storage medium of claim 1, wherein the program code marketplace comprises an application programming interface for receiving the program code.

8. The non-transitory computer-readable storage medium of claim 1, wherein the program code marketplace comprises an application programming interface for receiving the associated execution environment definition.

9. An apparatus comprising:
   a processor; and
   a computer-readable storage medium having instructions stored thereupon, when executed by the apparatus, cause the apparatus to:
      receive program code and an associated execution environment definition, the associated execution environment definition defining a suitable execution environment for the program code by providing configuration information for the suitable execution environment;
      perform one or more first tests on the program code;
      determine that the program code passed the one or more first tests;
      include the program code in a program code marketplace;
      receive a request from a user to deploy the program code from the program code marketplace to a service provider network;
      in response to receiving the request, utilize the associated execution environment definition to create the suitable execution environment for the program code in the service provider network;
      deploy the program code from the program code marketplace to the suitable execution environment in the service provider network;
      cause the program code to execute in the suitable execution environment created in the service provider network;
      perform one or more second tests of the program code in the suitable execution environment created in the service provider network;
      determine that the program code in the suitable execution environment passed the one or more second tests; and
      provide, to the user, access to the program code in the suitable execution environment.

10. The apparatus of claim 9, wherein the suitable execution environment comprises one or more virtual machine instances, and wherein the suitable execution environment definition provides configuration information for the one or more virtual machines instances.

11. The apparatus of claim 9, wherein the suitable execution environment comprises one or more computing resources, and wherein the suitable execution environment definition provides configuration information for the one or more computing resources.

12. The apparatus of claim 9, wherein the suitable execution environment comprises one or more network services, and wherein the suitable execution environment definition provides configuration information for the one or more network services.

13. The apparatus of claim 9, wherein the suitable execution environment comprises one or more other programs, and wherein the suitable execution environment definition specifies at least one program of the one or more of the other programs.

14. The apparatus of claim 9, wherein configuration information associated with the suitable execution environment specifies a configuration of at least one of hardware devices, virtual machine instances, computing resources, network services, other programs, network configurations, database resources, data storage resources, load balancing resources, DNS resources, VPC resources, VLAN resources, auto-scaling services, workflow services, queue services, search services, notification services, email services, or transcoding services.

15. A computer-implemented method comprising:

receiving program code and an associated execution environment definition, the associated execution environment definition defining a suitable execution environment for the program code by providing configuration information for the suitable execution environment;

performing one or more first tests on the program code;

determining that the program code passed the one or more first tests;

including the program code in a program code marketplace;

receiving a request from a user to deploy the program code from the program code marketplace to a service provider network;

in response to receiving the request, utilizing the associated execution environment definition to create the suitable execution environment for the program code in the service provider network;

deploying the program code from the program code marketplace to the suitable execution environment in the service provider network;

causing the program code to execute in the suitable execution environment created in the service provider network;

performing one or more second tests of the program code in the suitable execution environment created in the service provider network;

determining that the program code in the suitable execution environment passed the one or more second tests; and providing, to the user, access to the program code in the suitable execution environment.

16. The computer-implemented method of claim 15, wherein the suitable execution environment comprises one or more virtual machine instances, and wherein the suitable execution environment definition provides configuration information for the one or more virtual machines instances.

17. The computer-implemented method of claim 15, wherein the suitable execution environment comprises one or more computing resources, and wherein the suitable execution environment definition provides configuration information for the one or more computing resources.

18. The computer-implemented method of claim 15, wherein the suitable execution environment comprises one or more network services, and wherein the suitable execution environment definition provides configuration information for the one or more network services.

19. The computer-implemented method of claim 15, wherein the suitable execution environment comprises one or more other programs, and wherein the suitable execution environment definition specifies at least one program of the one or more of the other programs.

20. The computer-implemented method of claim 15, wherein the configuration information specifies a configuration of at least one of hardware devices, virtual machine instances, computing resources, network services, other programs, network configurations, database resources, data storage resources, load balancing resources, DNS resources, VPC resources, VLAN resources, auto-scaling services, workflow services, queue services, search services, notification services, email services, or transcoding services.

* * * * *